(12) United States Patent
Sanderson et al.

(10) Patent No.: US 7,069,844 B2
(45) Date of Patent: Jul. 4, 2006

(54) CONTINUOUS PROCESS FOR PRODUCTION OF SCRAMBLED EGGS

(75) Inventors: Charles Sanderson, Minneapolis, MN (US); Kevin Uptain, Minnetonka, MN (US); Robert Prochnow, Dellwood, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 10/683,860

(22) Filed: Oct. 10, 2003

(65) Prior Publication Data
US 2004/0076733 A1 Apr. 22, 2004

Related U.S. Application Data

(62) Division of application No. 09/961,790, filed on Sep. 24, 2001, now Pat. No. 6,759,076.

(51) Int. Cl.
*A23L 1/32* (2006.01)
(52) U.S. Cl. .................. 99/474; 99/355; 99/423; 99/426; 426/614
(58) Field of Classification Search .......... 99/474, 99/355, 423, 426; 426/614
See application file for complete search history.

(56) References Cited

U.S. PATENT DOCUMENTS

| | | | | |
|---|---|---|---|---|
| 1,813,064 | A | * | 7/1931 | Matzka .................. 426/244 |
| 3,364,038 | A | * | 1/1968 | Bartlett .................. 426/491 |
| 3,624,230 | A | * | 11/1971 | Robinson, Jr. .......... 426/614 |
| 3,987,212 | A | | 10/1976 | Seeley et al. |
| 4,200,663 | A | | 4/1980 | Seeley et al. |
| 4,228,193 | A | * | 10/1980 | Schindler et al. ........ 426/233 |
| 4,233,891 | A | | 11/1980 | Schindler et al. |
| 4,594,260 | A | | 6/1986 | Vacquiero et al. |
| 4,994,291 | A | | 2/1991 | Swartzel et al. |
| 5,054,384 | A | * | 10/1991 | Smith, Jr. .................. 99/335 |
| 5,354,323 | A | | 10/1994 | Whitebook |
| 5,427,816 | A | * | 6/1995 | Harlaux et al. .......... 426/614 |
| 5,455,054 | A | * | 10/1995 | Bryson et al. .......... 426/106 |
| 5,533,441 | A | * | 7/1996 | Reznik et al. ............ 99/455 |
| 5,670,198 | A | * | 9/1997 | Reznik et al. .......... 426/614 |
| 5,670,199 | A | * | 9/1997 | Swartzel et al. ........ 426/614 |
| 5,741,539 | A | * | 4/1998 | Knipper et al. .......... 426/614 |

* cited by examiner

*Primary Examiner*—Anthony Weier
(74) *Attorney, Agent, or Firm*—Fitch, Even, Tabin & Flannery

(57) ABSTRACT

The present invention is directed to a process and system for producing scrambled eggs having a homogenous firmness. The process and system maximizes scrambled egg product consistency and minimizes channeling, fouling and equipment wear previously associated with production of scrambled eggs by periodically interrupting the flow of egg through the system of the invention.

14 Claims, 9 Drawing Sheets

Freezing and Packaging

Freezing and Packaging deflector

CONTINUOUS PROCESS FOR PRODUCTION OF SCRAMBLED EGGS

This is a division, of prior application Ser. No. 09/961,790, filed Sep. 24, 2001, now U.S. Pat. No. 6,759,076, which is hereby incorporated herein by reference in its entirety.

FIELD OF THE INVENTION

This invention is directed to a process and a system for the production of scrambled eggs. More particularly, process and the system of the invention are directed to producing homogeneous scrambled eggs with a homogeneous firmness while minimizaing channeling and fouling of holding tubes used to cook the eggs product.

BACKGROUND OF THE INVENTION

Producing scrambled eggs having a homogeneous firmness at high volumes without channeling or fouling cooking equipment or damaging heating equipment as a result of the fouling has been a problem. During the initial heating of the eggs with a heat exchanger such as a scraped surface heat-exchanger, egg has fouled the heat exchanger even to the extent of breaking the heat exchanger blades.

Holding tubes where liquid egg is held at elevated temperatures to cook the eggs develop "channeling". This is where laminar flow develops, as egg thickens and/or coagulates at the outer boundaries of the holding tube but tends to stay liquid at the center. In this circumstance egg, flows faster through the center of the holding tube than at the outer perimeter, and as a result, develops a center channel. This creates a product which is not evenly cooked. For instance, egg flowing through the center channel tends to be undercooked, resulting in a watery or mushy egg product. At the same time, egg at the outer boundaries of the holding tube tends to be overcooked, resulting in very small pieces. The typical approach for minimizing laminar flow and eliminating large distributions of residence time in a hold tube is to induce turbulent flow. Turbulence is usually induced by creating high flow velocities or by providing mechanical shear (e.g. in a screw extrusion cooker). This is not acceptable in the production of scrambled egg product, however, as the solid and partially coagulated egg is very shear sensitive, as excessive shear leads to a finely granulated product with poor mouth feel.

OBJECTS OF THE INVENTION

It is an object of this invention to provide a continuous process for making scrambled egg product which is homogeneous in firmness and which is evenly cooked.

It is another object of this invention to provide a process and system for making evenly cooked scrambled egg product having a homogeneous firmness where the process will also minimize the fouling and channeling in the equipment used to cook the egg product.

These and other objects of the invention will become apparent with reference to the following summary and description.

SUMMARY

The present invention is directed to a process for the production of scrambled egg product and a system for practicing the process of the invention. The process and system maximizes scrambled egg product consistency and/or firmness homogeneity and minimizes channeling, fouling and equipment wear previously associated with the production of scrambled eggs. Maximization of egg product homogeneity and/or consistency and minimization of channeling and fouling is provided by periodically interrupting the flow of egg through the system of the invention. Flow interruption is achieved by stopping and starting the flow of heated liquid egg product in the holding tube effective for providing a discontinuous flow of heated egg product in the holding tube. This reduces laminar flow of the heated egg product in the holding tube compared to a laminar flow of heated egg product which would develop in the holding tube without the stopping and starting.

With elimination and/or control of egg channeling in holding tubes where egg is cooked, the process of the invention eliminates or controls undercooking of the eggs and mushy texture that results from insufficient or non-uniform cooking. The process provides scrambled egg product that is sufficiently cooked to allow egg protein to coagulate and provide scrambled egg product having a homogeneous firmness of from about 20 mm to about 50 mm (as hereinafter defined) as it exits the holding tube where it is cooked. Further, it has been observed that overcooking of the egg product and/or subjecting the cooked egg product to significant shear results in an unacceptably large quantity of fines (small particles) in the final product. The process described in the invention avoids the production of these fines by minimizing the opportunity for "thermal shock" (the development of significant thermal gradients), and ensuring that the velocity, and hence residence time, of egg product in the holding tube is more uniform.

In accordance with the process of the invention, liquid egg product is first heated to a temperature less than a cooking temperature for the egg, but the temperature being sufficiently high to prevent heat shock of the liquid egg product and prevent non-uniformity in the scrambled eggs produced by the process and system of the invention. The initially heated egg then is further heated to provide a homogeneously heated egg product. This additional or further heating brings the egg to a temperature which is effective for cooking the egg product and effective for causing the heated liquid whole egg product to coagulate when the liquid egg product is held in a holding tube downstream from the area of the additional heating. This brings the egg product to a cooking temperature to provide a cooked egg product with an apparent viscosity greater than about 1500 centipoises as measured with a Brookfield viscometer with a spindle No. 5 and a constant spindle speed of 20 revolutions per minute. After the egg product is brought to a cooking temperature it is transported to a holding tube. The homogeneously heated egg product is held in the holding tube at the cooking temperature for an amount of time effective for forming a fully coagulated and cooked egg product. The flow of egg product-in the holding tube is stopped and started to provide a discontinuous flow of the homogeneously heated liquid egg product in the holding tube. This stopping and starting is effective to significantly reduce the velocity gradient where egg at the center of the tube moves faster than egg at the outer periphery of the tube; and hence, reduces the range of residence times experienced by the cooked egg flowing through the holding tube as compared to the flow pattern that could be expected to develop in the holding tube with continuous feed. After cooking, the fully coagulated cooked egg product is removed from the holding tube. The process and system of the invention may be used to process and cook liquid whole egg, as well as liquid egg product as defined herein.

The initial heating of the egg product brings cool egg from temperatures such as about 39° F. (or about 4° C.) to a temperature in the range of from about 130° F. to about 154° F. in about 1 to about 25 minutes, preferably about 5 to 25 minutes. This eliminates thermal shock to the egg when brought to cooking temperature, which shock will cause a rapid and sudden coagulation of at least some part of the egg. This will ultimately cause a non-uniform coagulation and cooking of the egg product in the holding tube.

During the initial heating, the egg product may increase to a viscosity of from 100 cps to about 1500 cps (Brookfield viscometer with a spindle No. 5 and a constant speed of 20 rpm measured at 25° C.). The initial heating may be accomplished using any type of heat exchanger as known in the art for this purpose, such as a tube in tube pre-heater.

After the initial heating, the initially heated liquid egg product is further heated as uniformly as possible to bring the egg product to a cooking temperature before it is transported to a holding tube for cooking. If the egg is brought to temperature with a hot surface, a significant thermal gradient should not be allowed to develop. To this end, a scraper can be used to continuously refresh the material at the hot surface with cooler material from the bulk of the egg in the heating device. Alternatively, local turbulence may be induced in the heating device, without causing significant turbulence downstream, by using pulsed flow through the heat exchanger. The hot liquid egg is much less shear sensitive than the completely or partially coagulated material, and so acceptable product can be produced despite the level of shear induced during heating.

Uniformity of the heating and avoidance of a large temperature gradient in the egg product ultimately effects the homogeneity of firmness of the egg product exiting the-holding tube. Hence, the measures used to minimize thermal gradients during the final heating step should be sufficient and effective for providing the egg product exiting the holding tube with a homogeneous firmness in the range of from about 20 mm to about 50 mm when the egg product also is subjected to the discontinuous flow as described in this application.

In one aspect of the invention, steam is injected into the egg product to further and homogeneously heat the egg product to a cooking temperature in the range of about 163° F. to about 175° F. The steam generally is injected at a pressure of from about 5 psi to about 40 psi. The steam injection is immediately followed by a shear-inducing step such as, in the preferred embodiment, a pump. The injection of the steam and operation of the downstream mixing device is done in a manner, rate and pressure that is effective for maintaining a homogenous product with a uniform and homogeneous firmness in the range of from about 20 mm to about 50 mm, preferably about 25 mm to about 45 mm as the egg product exits the holding tube. The steam temperature generally ranges from about 240° F. to about 270° F.

When liquid egg product is transported into the holding tube and the flow of product through the holding tube is interrupted or stopped then started, the product has a residence time in the holding tube effective for providing the firmness described above which is generally about 8 to about 15 minutes being cooked at a temperature range of about 163° F. to about 175° F.

The process of the invention may be batch or can be continuous, even with one holding tube. A reciprocating pump can provide the interruption or stoppage of the flow of egg product through a system with one holding tube. In a system with one hold tube, a device that allows a near continuous feed while providing a discontinuous output may be introduced between the heating and holding parts of the process. A device such as a reciprocating pump may be used for this purpose. In an important aspect, multiple holding tubes may be used to make the process continuous with the flow of homogeneously heated egg product in one holding tube continuing while the flow of egg product in at least one other tube is stopped. In a preferred aspect, the process and system of the invention has two insulated holding tubes. In this aspect of the invention, the homogeneously heated liquid egg product is transported into one of the holding tubes. A flow control regulator or valve switches the flow of homogeneously heated egg product from a first holding tube then to a second holding tube and then back to the first tube at intervals which push product through the tube, but allow product to reside in the tube to cook the egg and provide the egg product with a homogeneous firmness of at least about 50 mm or keep the egg product in the tube for the times and temperatures indicated above. Alternatively, product may be pumped through more than two tubes at appropriate intervals to effect discontinuous flow through the tubes.

After exiting the holding tube(s), fully coagulated or cooked egg product may be extruded to form a homogeneous scrambled egg product having the firmness in the range of from about 20 mm to about 50 mm. The scrambled egg product may be immediately frozen and packaged or may be mixed with other food items and then frozen and packaged.

In another aspect, the invention further provides a continuous system for producing scrambled eggs. The system includes a holding tank effective for providing liquid whole egg product. The liquid whole egg product is transported to a heat exchanger which is effective for initially heating the liquid egg product to a temperature of not more than about 154° F. and to prevent heat shock of the liquid egg product in subsequent processing steps.

The system of the present invention may further include a steam inlet effective for providing an injection of steam at a temperature and pressure sufficient to raise the egg product to a temperature at which cooking can occur, followed by a device to impart significant mixing and increase in pressure, such as a Silverson Shear pump, effective for ensuring that the steam energy is provided homogenously to the egg mixture. The pump provides the environment that insures that the heat from the steam is rapidly dispersed within the liquid egg product, thereby avoiding thermal shock. Further, the downstream pump provides part of the backpressure needed to force material through the hold tube, thereby allowing the steam to be introduced at a lower pressure (temperature) than would otherwise be possible. The steam injection and subsequent pump are operated in a manner effective for evenly heating the liquid egg product to a cooking temperature which will cook the egg product in the holding tube(s) as described above. In an important aspect, the steam heated liquid egg product has a temperature in the range of from about 163° F. to about 175° F. The system of-the invention includes a means for controlling the flow of steam heated egg product, such as a reciprocating pump or valve, to at least one holding tube, and preferably at least two holding tubes. Egg product is maintained in the holding tube(s) at a time and temperature effective for forming a fully coagulated or cooked egg which has a uniform firmness in the range of from about 20 mm to about 50 mm when it exits the holding tube. The scrambled egg product from the holding tube then is extruded through an extruder.

DETAILED DESCRIPTION

Definitions

"Liquid whole egg" means egg white and yolk in the ratio which is generally recognized as the ratio of yolk to white in shell eggs. That ratio generally is in the range of from about 1 part yolk to about 2 parts egg white. Liquid whole egg generally has about 23.5 weight percent solids and 76.5 weight percent water. The liquid whole egg may include other additives such as salt, sugar, nisin, starch and xanthan gum.

As used herein the term "liquid egg product" means a product comprising from about 8% to about 40% egg yolk and from about 67% to about 81% egg white which product may include additional additives.

"Scrambled egg product" is made according to the invention using liquid egg product.

Figure 5:
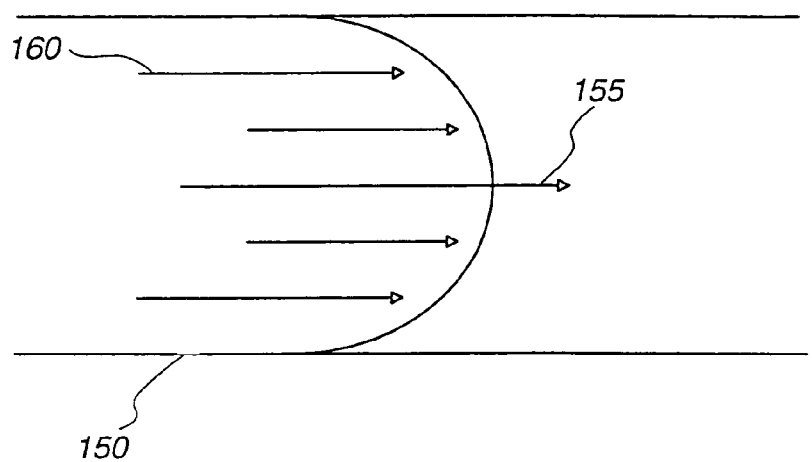
FIG. 5 illustrates laminar flow.

"Laminar flow" means a flow of liquid egg in a conduit which is faster at the center of a conduit, but slower at the outer dimension of the conduit as seen in FIG. 5.

"Homogeneous firmness" throughout the egg product means that at least about 95 weight percent of cooked egg product exiting the holding tube has a specified firmness, such as from about 20 mm to about 50 mm.

Figure 1:
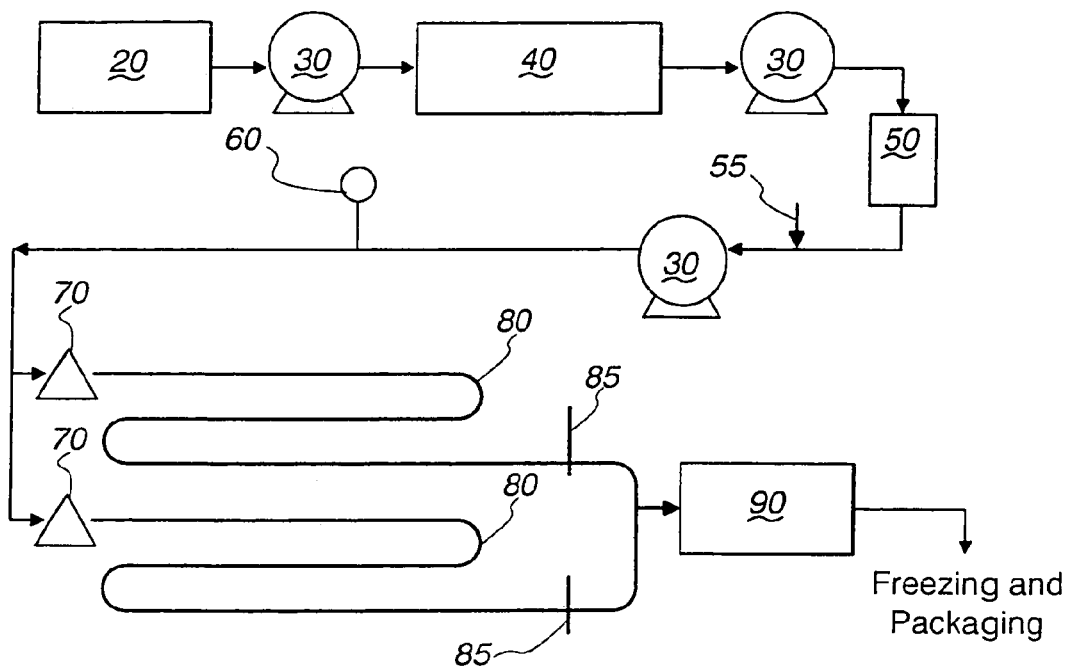
FIG. 1 illustrates an aspect of the invention where the process includes steam injection and two holding tubes.

One aspect of the present invention is illustrated in FIG. 1. As shown in the FIG. 1, liquid whole egg or liquid egg product may be provided to the process in a holding tank 20 which is maintained at a temperature of from about 35° F. to about 45° F. Liquid egg product is pumped via a pump 30 downstream to a heat exchanger 40. Heat exchanger 40 may be any type of heat exchanger as known in the art for this purpose, but a tube in tube heat exchanger is preferred. Examples of the types of heat exchangers, which may be used at this point of the process includes a triple tube heat exchanger, a plate and frame heat exchanger, Roswell heater (tubular exchanger which uses a rectangular shaped annular area between two cylindrical heat transfer surfaces), and electrical resistance heated tubes.

In this aspect of the invention, the liquid egg product is heated to a temperature of about 130° to about 154° F. for about 1 to about 25 minutes, preferably from about 140° F. to about 145° F. to provide the initially heated liquid egg product. The initially heated liquid egg product has a viscosity of about 100 cps to about 1500 cps.

As further shown in FIG. 1, heated liquid egg product is pumped via pump 30 downstream of the heat exchanger 40 through check valve 50. Steam is injected into the initially heated liquid egg product at a steam injection site 55 to bring the egg to a cooking temperature. In this aspect of the invention, steam is injected at a pressure of about 20 to about 40 psi, the steam having a temperature of from about 240° F. to about 270° F. to provide a homogeneous heated liquid egg product. The steam used is of food grade and is produced by processes known in the art for this purpose. Steam injection at the indicated pressures is such that the subsequent pump provides sufficient mixing of the egg product to effect a homogenous cooked product as it exists the holding tubes.

In the aspect of the invention shown in FIG. 1, the homogeneous heated egg product is transported via valve 70 downstream to insulated holding tubes 80. Holding tubes 80 are effective to maintain a temperature of from about 163° F. to about 175° F. for about 8 to about 15 minutes to fully cook the egg product which is removed from the holding tube. The egg product has a uniform firmness in the range of from about 20 mm to about 50 mm. During continuous operation of the process, the flow of product into one holding tube 80 occurs while the flow of product into the other holding tube is stopped. The valve 70 switches the flow of the egg back and forth between holding tubes 80 such that product has a residence time in each holding tube as described above. Valves 70 may be any type of valves known in the art for this purpose, and may be controlled by any type of controllers known in the art for this purpose.

After exiting holding tube 80, the fully coagulated or cooked egg product is extruded at extruder 90. The extruder 90 may include any type of extruder known in the art for this purpose. Examples of extruders that are effective for use with the process of the present invention include those shown in FIGS. 10–14, but the egg product flowing therefrom will have a uniform firmness of from about 20 mm to about 50 mm.

The extruded egg may be directly frozen and packaged or mixed with other food products and then frozen and packaged. Examples of other food products that can be mixed with the eggs include vegetables, meat products, nuts and grains, and mixtures thereof.

Figure 2:
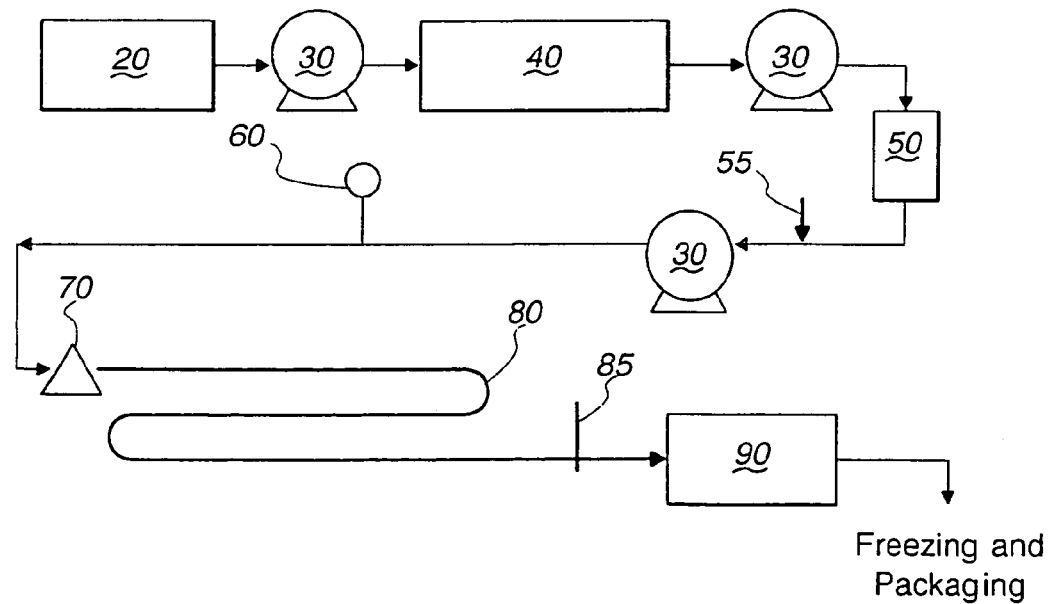
FIG. 2 shows an aspect of the invention where the process includes steam injection and one holding tube.

In another aspect of the present invention, egg product is transported to a single holding tube 80 as is shown in FIG. 2. In this aspect of the invention, the flow of egg is disrupted and/or stopped and started by a reciprocating pump 70 to allow product to reside in the holding tube 80 for about 8 to about 15 minutes at the temperatures described above. The reciprocating pump 70 accepts liquid egg product on a continuous basis, with the barrel of the pump being gradually filled between cycles. Material is provided to the holding tubes in the form of pulses, with each pulse of liquid egg product into the tube displacing an equal volume of material from the product end of the holding tube.

Figure 3:
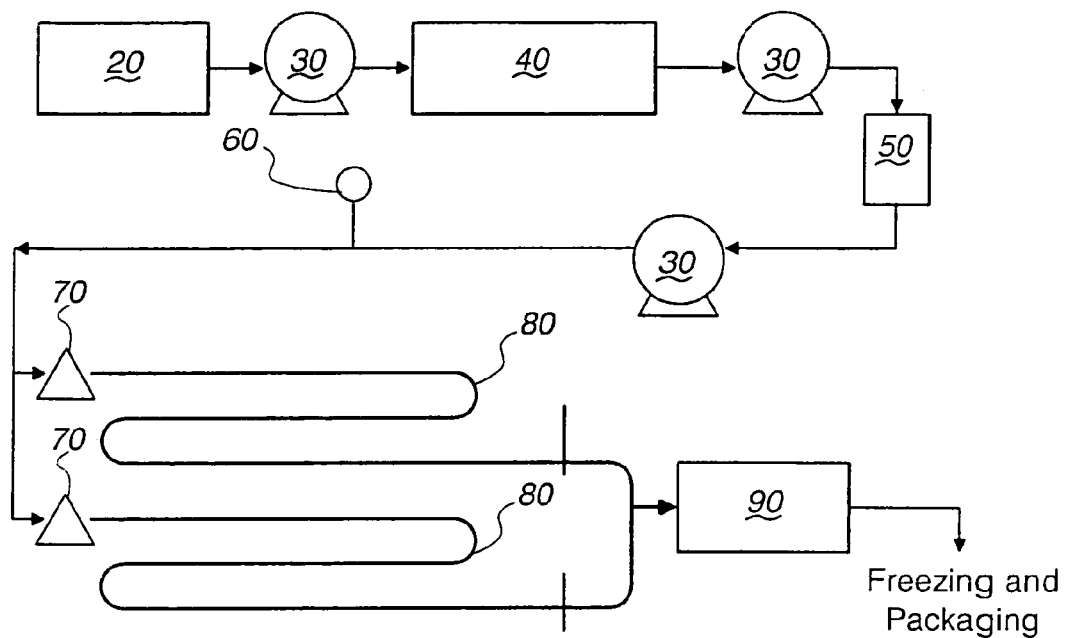
FIG. 3 illustrates an aspect of the invention where the process includes heat exchangers and two holding tubes.

FIG. 3 illustrates an aspect of the invention where the egg product is homogeneously heated with a scraped surface heat exchanger 45 which product then is transported to two holding tubes 80, the flow there being disrupted by valve 70.

Figure 4:
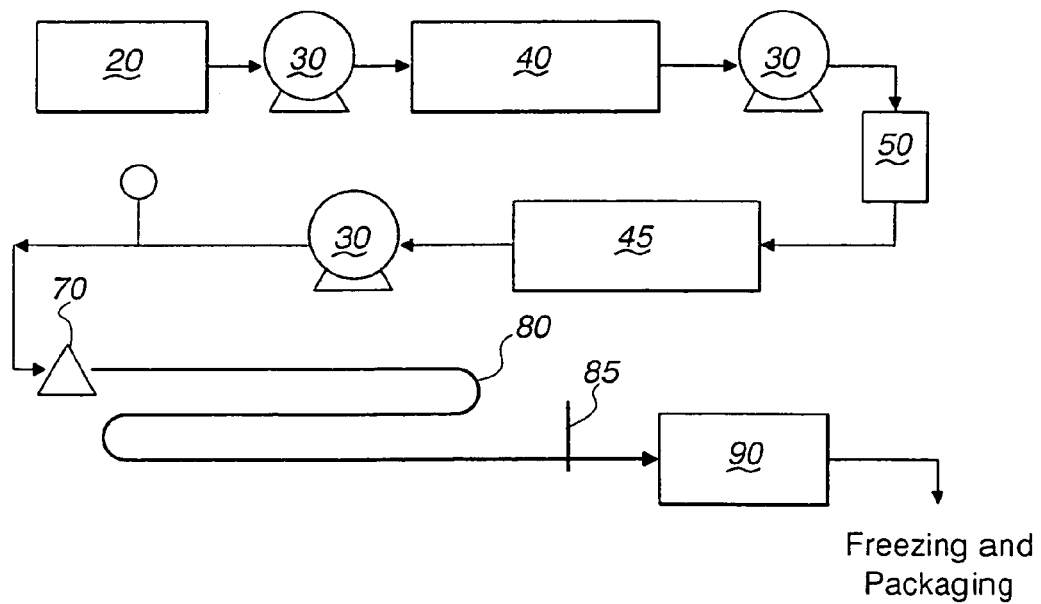
FIG. 4 illustrates an aspect of the invention where the process includes heat exchangers and one holding tube.

FIG. 4 illustrates an aspect of the invention where egg product is homogeneously heated in a heat exchanger 45, and then is transported to one holding tube with the flow of egg product being disrupted by reciprocating pump 70.

The interruption or stoppage and subsequent start of product flow through the holding tube 80 is effective for eliminating significant radial velocity gradients in the egg product flowing through the tube. This ensures a uniform, narrowly distributed residence time of the product at the cooking temperature, providing a product that is homogenous in terms of protein and starch structure, firmness and particle size. The observations about product homogeneity were supported by lab analysis of the product from various implementation of the system described herein, as discussed in examples 1–5.

Lamellar flow, or laminar flow as shown in FIG. 5, occurs where a flow rate of material at the middle 155 of a conduit 150 is higher than the flow rate of the materials towards the outside 160 of the-conduit. Laminar flow occurs when materials flow through tubes or conduits with moderate velocities. A thin layer of material in contact with the tube wall may be stationary, the next layer flows slowly, and the adjacent layer faster. The material then flows as if it consisted of many thin concentric cylinders, each moving with a constant velocity which increases from the wall toward the center of the tube. The present invention minimizes or eliminates laminar flow with the interruption or stoppage and then subsequent start of product flow as described above.

Extruder plates that may be used in the process of the present invention are shown in FIGS. 10–14. The extruder plates are effective for providing eggs having a functional piece size similar in appearance and size to freshly prepared scrambled eggs. Fully cooked scrambled eggs exit the hold tube under a constant steady pressure of about 10 psig to about 30 psig. The cooked egg is forced through orifices 140 of extruder plate 150 (shown in FIGS. 10–14). The extruder plate 150 may include a number of designs and orifice sizes as shown in FIGS. 10–14.

Figure 10:
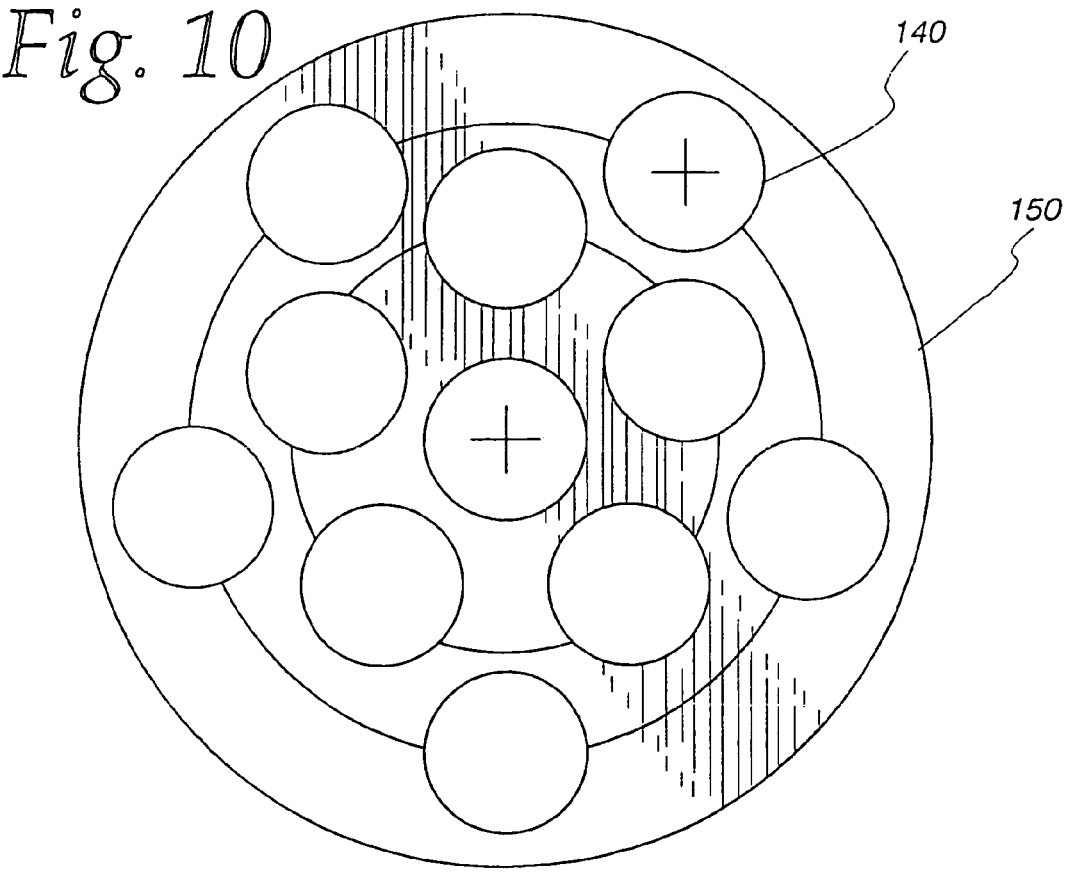
FIG. 10 illustrates a front view of an extruder plate.

In the extruder plate shown in FIG. 10, the extruder plate 150 has a diameter of about 2⅞ inches and the orifices have a diameter of about 35/64 inches. The center of orifices 140 located on the outer edge of extruder plate 150 are about 2⅛ inches from the center of the extruder plate 150. The center of orifices located more to the center of the extruder plate are about 1¼ inch from the center of the extruder plate.

Figure 11:
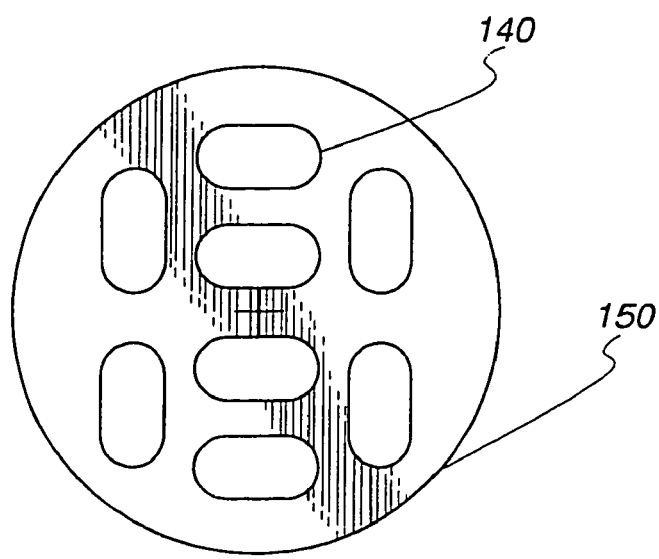
FIG. 11 illustrates a front view of an extruder plate.

In the extruder plate shown in FIG. 11, the extruder plate 150 has a diameter of about 2⅞ inches and includes oblong shaped orifices 140. The oblong shaped orifices have a length of about ¾ inch and a width of about ½ inch. Orifices are spaced apart at least 11/64 inches.

Figure 12:
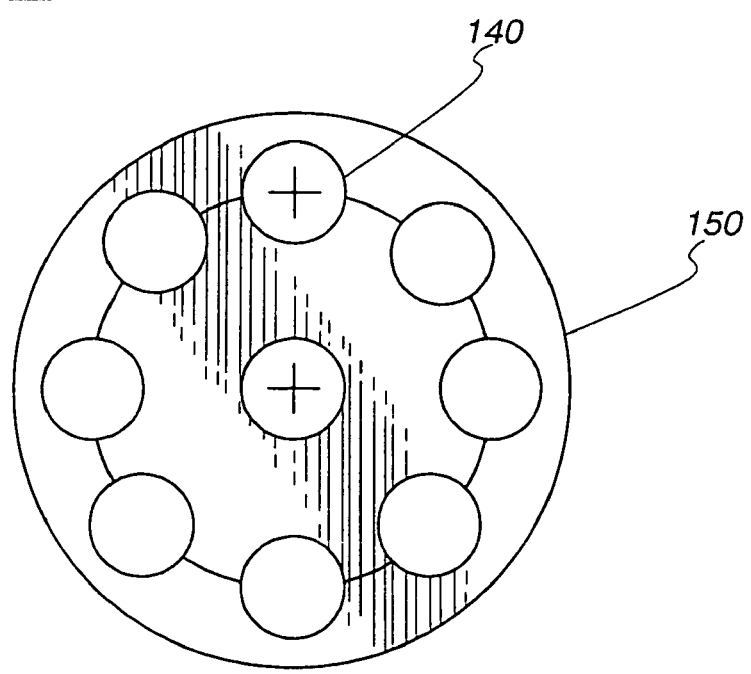
FIG. 12 illustrates a front view of an extruder plate.

In the extruder plate shown in FIG. 12, the extruder plate 150 includes orifices 140 having a diameter of about 39/64 inches. The center of these orifices is located about 2 inches from the center of the extruder plate.

Figure 13:
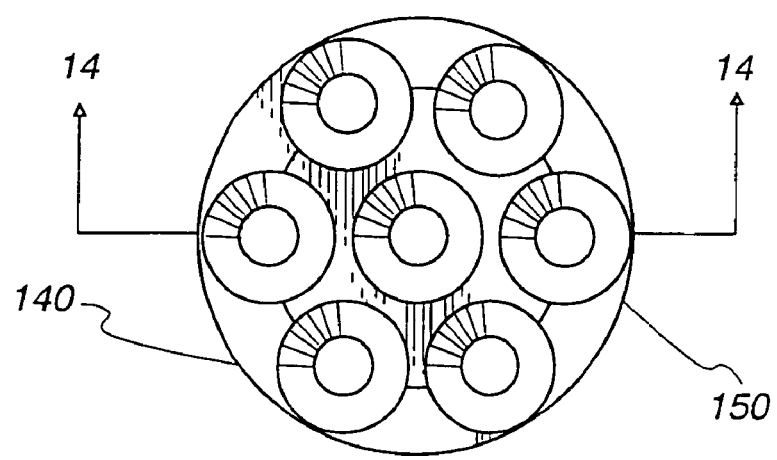
FIG. 13 illustrates a front view of an extruder plate.
Figure 14:
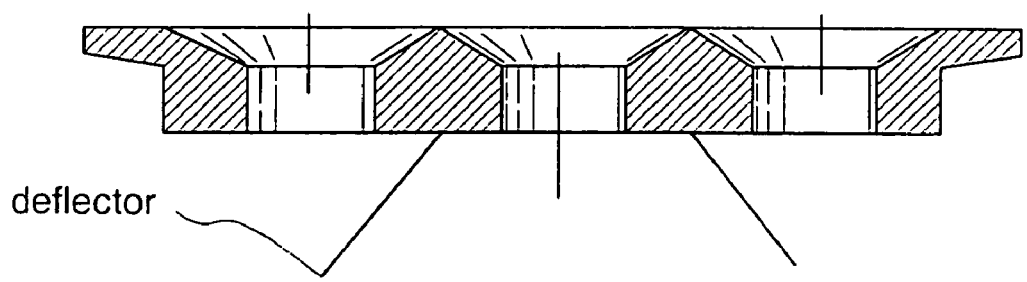
FIG. 14 illustrates a side view of an extruder plate.

In the extruder plate shown in FIG. 13, the extruder plate 150 has a diameter of about 3.5625 inches and the orifices 140 have a diameter of about 0.9705 inches. A cross sectional view of the extruder plate along line AA is shown in FIG. 14.

EXAMPLES

Example 1

Scraped Surface Heat Exchanger with Discontinuous Flow

Figure 6:
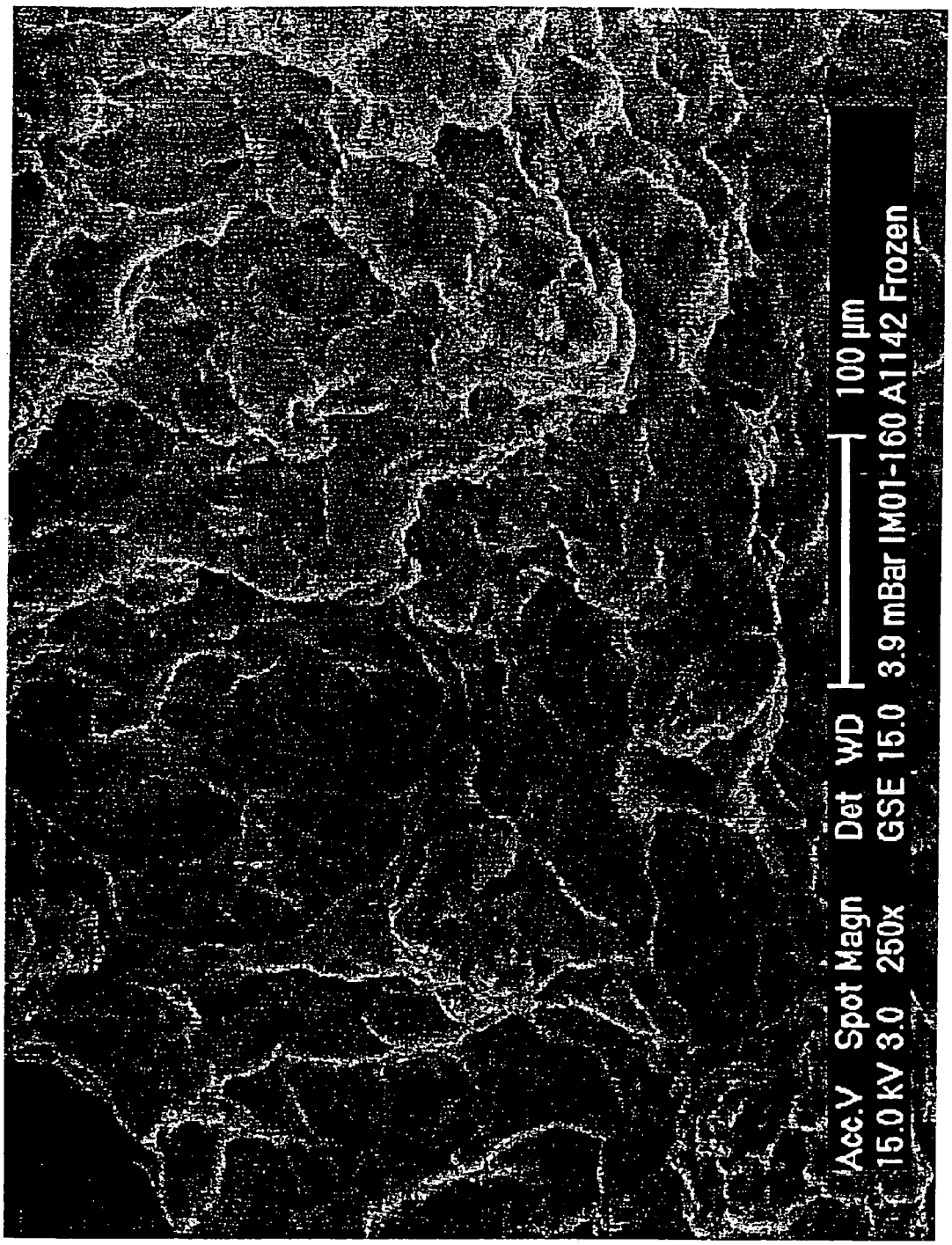
FIG. 6 illustrates environmental scanning electron microscope image of egg heated with a scraped surface heat exchanger and with discontinuous flow through a holding tube.

Liquid whole egg product at a temperature of 40° F. was pumped by use of a positive displacement pump through a water-jacketed tube in tube pre-heater and brought to a temperature of 140° F. The preheated liquid whole egg product was then pumped by means of a positive displacement pump into a scraped surface heat exchanger (SSHE). The dasher contained within the barrel was operated at 270 rpm. Hot water was circulated in the jacket of the SSHE barrel and heat was indirectly transferred to product contained within the barrel. As the liquid whole egg product exited the SSHE at a temperature of about 170° F., it immediately entered one branch of the hold tube. After a period of about 5 minutes, a rotating valve opened to a second 100-foot branch of the holding tube and product was forced into this section of the hold tube. The proteins contained within the liquid whole egg product denatured and coagulation occurred within the hold tube. For a period of 5 minutes the heated liquid whole egg-product was left undisturbed. At the exit of the hold tube, the fully cooked egg was forced through an extrusion plate. The egg pieces were immediately frozen, packaged in bags and the bags were placed in mastercases. FIG. 6 represents environmental scanning electron micrograph from samples subjected to the above process.

Legends in FIGS. 6, 7, 8 and 9 are as follows.
Acc. V—Accelerating voltage—the voltage used in the electron beam (energy applied).
Spot—spot size diameter of electron beam in microns.
Magn—Magnification of the image, in this case 250 times.
Det—detector used in the imaging system. In this case GSE-Gaseous Secondary Electron.
WD—working distance from the surface of the sample in millimeters: in these cases 11.5 to 15.0 mm.
MBar—millibars of water vapor in the electron chamber: in these cases 3.9 to 4.9 mbar.
100 um—is the size of the reference bar on the image.
IM01-160 is the internal project number.
A1144 is the internal sample number.
All samples were frozen.

Example 2

Steam Injection with Discontinuous Flow

Figure 7:
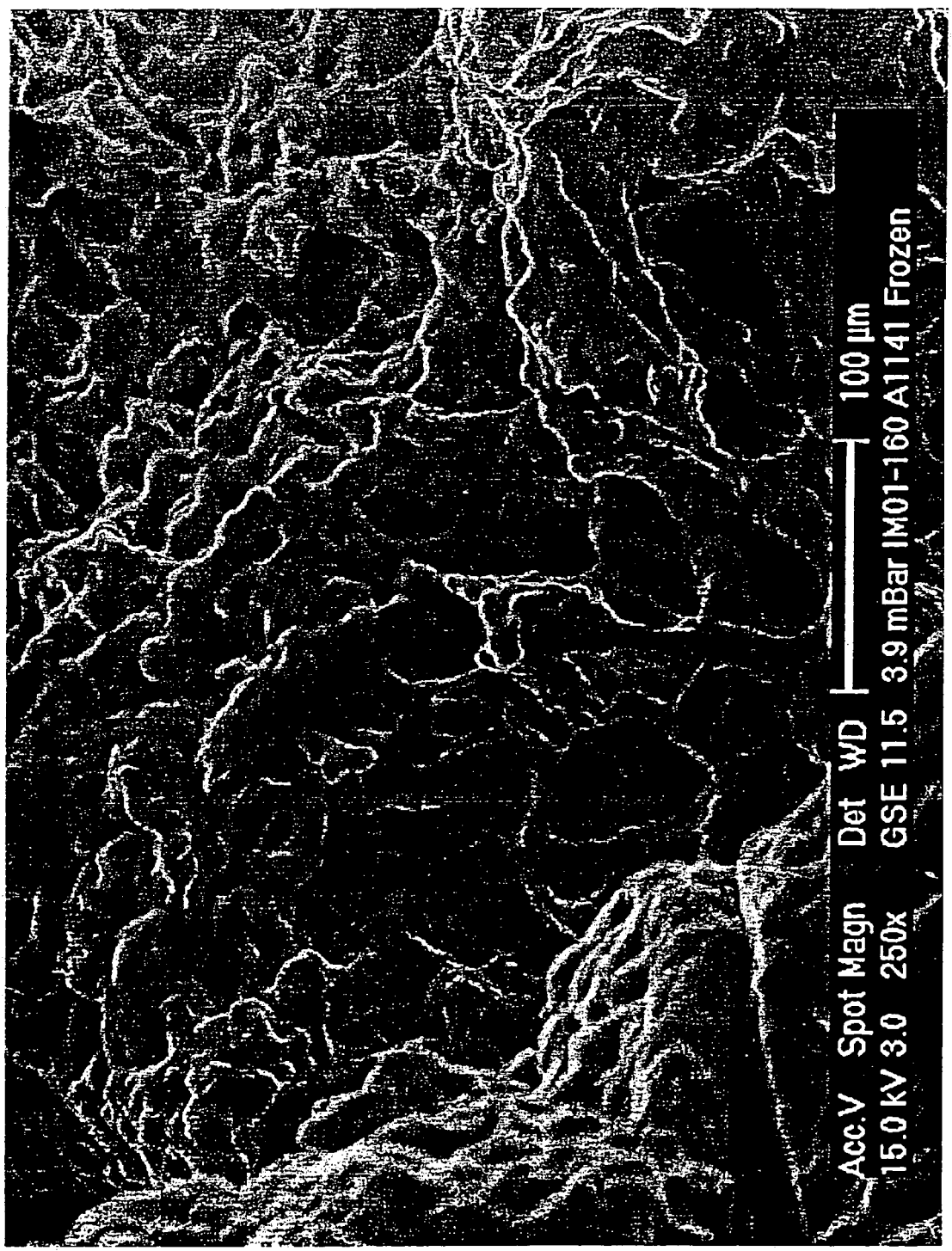
FIG. 7 illustrates an environmental scanning electron microscope image of egg heated with steam injection and with discontinuous flow through a holding tube.

Liquid whole egg product at a temperature of 40° F. was pumped through the use of a positive displacement pump through a water-jacketed tube in tube pre-heater and brought to a temperature of 140° F. The pre-heated liquid whole egg product was then pumped to the site of steam injection. Forty pounds of steam was introduced into the stream of liquid whole egg product. The pre-heated liquid egg product was flowing at a rate of 2300 pounds per minutes. Immediately adjacent to the point of steam injection, sufficient turbulence was created to incorporate and disperse steam. The liquid whole egg product, at a temperature of about 170° F., immediately entered one branch of the hold tube. After a period of 5 minutes, a rotating 3-way valve opened so that product flows into a second branch of the holding tube. The proteins contained within the liquid whole egg product denature and coagulation occurs within the hold tube. For a period of 5 minutes the heated liquid whole egg product was left undisturbed. At the exit of the hold tube, the fully cooked egg was forced through an extrusion plate. The egg pieces were immediately frozen, packaged in bags and the bags were placed in mastercases. FIG. 7 represents an environmental scanning electron micrograph from samples subjected to the above process.

Example 3

Scraped Surface Heat Exchanger with Continuous Flow

Figure 8:
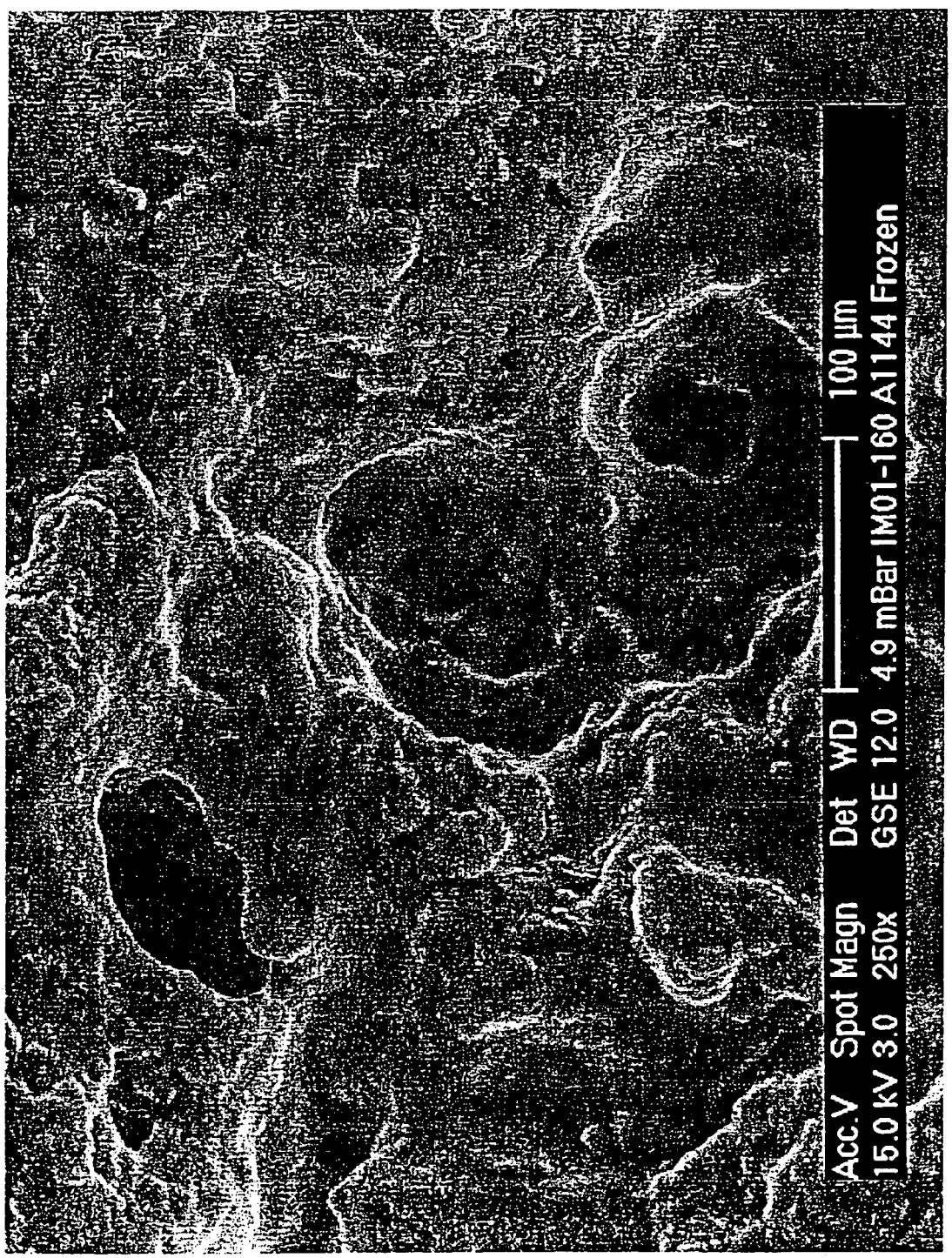
FIG. 8 illustrates environmental scanning electron microscope image of egg heated with a scraped surface heat exchanger and with continuous flow through a holding tube.

Liquid whole egg product at a temperature of 40° F. was pumped through the use of a positive displacement pump through a water-jacketed tube in tube pre-heater and brought to a temperature of 140° F. The preheated liquid whole egg product was then pumped by means of a positive displacement pump into a scraped surface heat exchanger (SSHE). The dasher contained within the barrel was operated at 270 rpm. Hot water was circulated in the jacket of the SSHE barrel and heat was indirectly transferred to product contained within the barrel. As the liquid whole egg product exited the SSHE at a temperature of about 170° F., it immediately entered a hold tube. The proteins contained within the liquid whole egg product denatured and coagulation occurred within the hold tube. At the exit of the hold tube, the fully cooked egg was forced through an extrusion plate. The egg pieces were immediately frozen, packaged in bags and the bags were placed in mastercases. FIG. 8 represents an environmental scanning electron micrograph from samples subjected to the above process.

Example 4

Steam Injection with Continuous Flow

Figure 9:
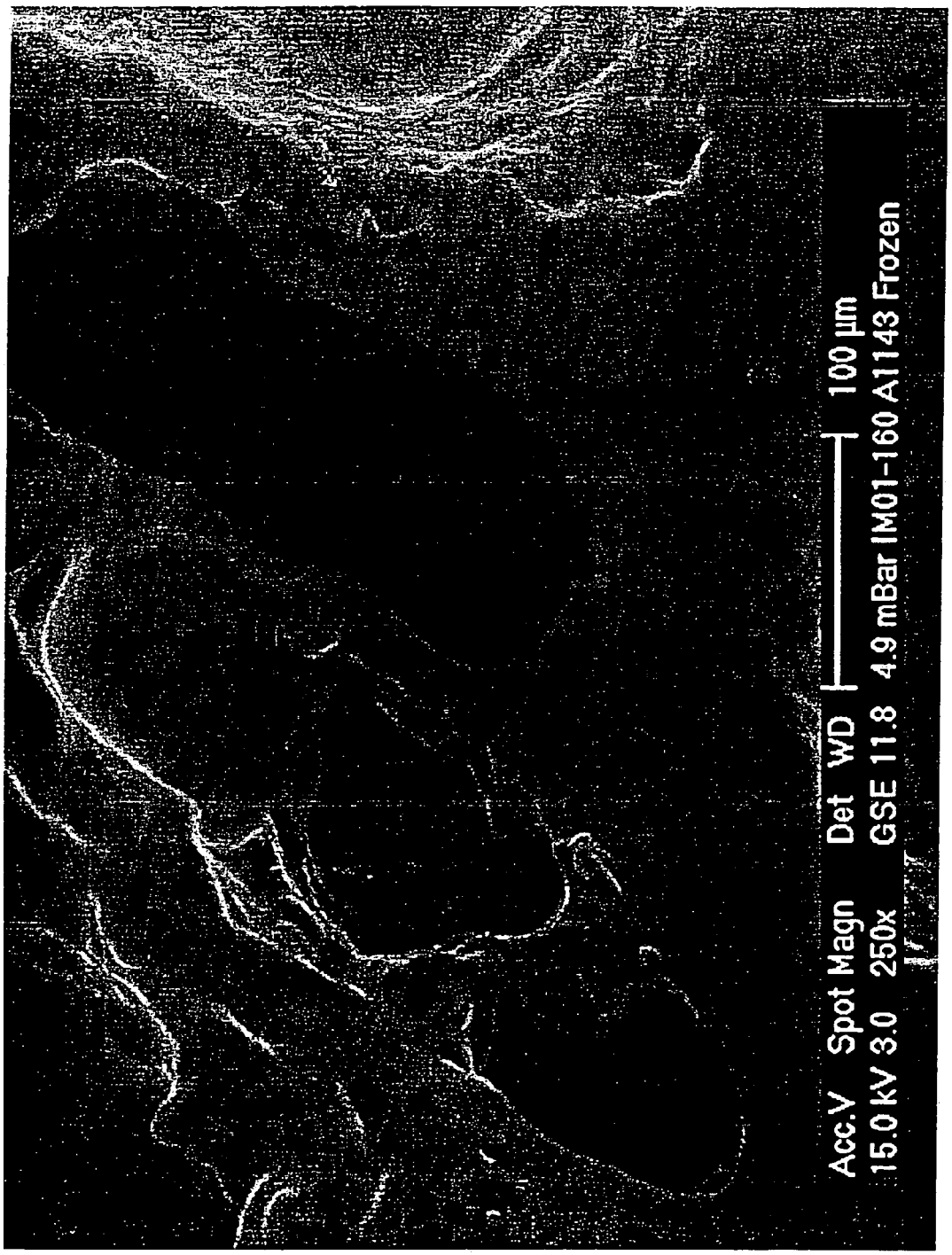
FIG. 9 illustrates environmental scanning electron microscope image of egg heated by steam injection and with continuous flow through a holding tube.

Liquid whole egg product at a temperature of 40° F. was pumped through the use of a positive displacement pump through a water-jacketed tube in tube pre-heater and brought to a temperature of 140° F. The pre-heated liquid whole egg product was then pumped to the site of steam injection. Forty psi of steam was introduced into the stream of liquid whole egg product. The pre-heated liquid egg product was flowing at a rate of 2300 pounds per minutes. Immediately adjacent to the point of steam injection, sufficient turbulence was created to incorporate and disperse steam. The liquid whole egg product, at a temperature of about 170° F., immediately entered a hold tube. The proteins contained within the liquid whole egg product denatured and coagulation occurred within the hold tube. At the exit of the hold tube, the fully cooked egg was forced through an extrusion plate. The egg pieces were immediately frozen, packaged in bags and the bags were placed in mastercases. FIG. 9 represents an environmental scanning electron micrograph from samples subjected to the above process.

Example 5

Comparison of Cooked Eggs

Four samples (Examples 1–4) of cooked egg product were evaluated for: 1. morphology differences, 2. protein matrix differentiation, and 3. degree of starch gelatinization. The samples evaluated were: FIG. 8 (Example 3)—scraped surface heat exchanger with continuous flow; FIG. 6 (Example 1)—scraped surface heat exchanger (SSHE) with discontinuous flow; FIG. 9 (Example 4)—steam injection with continuous flow; FIG. 7 (Example 2)—steam injection with discontinuous flow. These samples were subjected to environmental scanning electron microscopy, Raman hyperspectral imaging, and automated polarized light microscopy.

The general conclusions about morphology are as follows.
1. The discontinuous processes produce similar results in terms of morphology;
2. The continuous steam injection process produces strikingly different morphology-product than the SSHE continuous process;
3. Eggs produced from steam injection with continuous flow (FIG. 9, Example 4) had much larger holes in the structure than eggs produced by a SSHE with continuous flow (FIG. 8, Example 3); and
4. The core and edges of eggs produced by a SSHE with continuous flow (FIG. 8, Example 3) are very different in structure whereas the core and edges of eggs produced from steam injection with continuous flow (FIG. 9, Example 4) are more similar.

In general, the discontinuous process samples are essentially homogeneous with regard to protein.

The general conclusions about the starch gelatinization are as follows.
1. The continuous flow samples (Examples 3 & 5), and particularly the continuous flow with steam injection (Example 4), show a more crystalline starch structure, indicative of non-gelled starch.
2. The dicontinuous flow samples (Examples 1 & 2) have no indication of non-gelatinized starch.

These observations of starch and protein structure demonstrate that, regardless of the heating method used, the distribution of residence times caused by operating the holding tube with continuous flow has a significant influence on the product homogeneity, and that the use of discontinuous flow to reduce the distribution of residence times leads to a more homogenous product. This increased homogeneity has a significant, positive influence on the acceptability of the final product.

Example 6

Texture Evaluation Test Procedure for Egg Products

Egg product firmness was measured according to the following procedures.
1. A standardized cup (16 oz., 473 ml) was filled with product and weighed on a Sauter RP 3000 scale. Total weight was between 380 and 460 grams.
2. A lid was placed on the cup and the cup was stored in a warm place until the temperature reached 50° F. to 75° F. The cup with contents was tapped on a flat surface one time.
3. Two leveling screws and a bubble level were used to level a penetrometer (Precision Scientific Petroleum Instruments, Bellwood, Ill.) before each use.
4. The combined weight of the cone (102.5 grams) and the test rod (47.5 grams) makes us the required load. Prepared samples were placed in position on the base of the penetrometer.
5. The height of the unit was adjusted so the point of the cone was brought exactly into contact with the surface of the fully cooked egg sample. Coarse and fine adjustment knobs were used.
6. Before releasing the thumb release lever, the dial pointer was set at zero. If not, the "zero adjust nut" was adjusted until the dial pointer was pointing to zero.
7. The cone and test rod were released allowing the penetrating instrument to descend into the sample. The test rod was released by depressing the thumb release lever and holding the thumb release lever for 5 seconds.

8. The depth gauge rod was gently pushed down as far as it would go. The dial reading indicated the depth of penetration directly in tenth of millimeters.

9. Values were read and recorded. Dial readings gave penetration in tenths of millimeters up to 270 point. Hence, on depths greater than 38 mm, the dial pointer moves past the zero position. A given value was added to 38.0 to determine total depth of penetration.

10. The cone was raised and the dial pointer was returned to zero by depressing the thumb and lift.

11. The procedure was repeated with a new sample and average values were recorded.

12. Product texture rating as well as extrusion plate hole diameter, product number and temperature of the sample was recorded.

Instrumentation used was Universal Penetrometer Catalog 73510 manufactured by Precision Scientific Petroleum Instruments Company 2777 Washington Blvd. Bellwood, Ill. 60104.

What is claimed is:

1. A system for producing scrambled egg product, the system comprising:

a holding tank effective for holding a liquid egg product at below a temperature of about 50° F.;

a heat exchanger effective for heating the liquid egg product from the holding tank to a temperature in the range of from about 130° F. to about 154° F. to provide an initially heated liquid egg product;

a steam injection device effective for injecting steam into the initially heated liquid egg product and providing a steam heated liquid egg product, the steam effective for heating the initially heated liquid egg product to a cooking temperature;

at least two holding tubes which receive a flow of steam heated liquid egg product;

and a valve for controlling the flow of eggs to the at least two holding tubes, the valve effective for stopping and starting the flow of steam heated liquid egg product and switching the flow of egg product between the at least two holding tubes, the at least two holding tubes maintaining the steam heated egg product for a time and temperature effective for cooking the steam heated egg product.

2. The system as recited in claim 1 wherein the system further includes an extruder downstream from the holding tubes for forming scrambled egg product.

3. The system as recited in claim 2, wherein the system provides the scrambled egg product with a homogeneous firmness of from about 20 mm to about 50 mm.

4. A system for producing scrambled egg product, the system effective for moving egg from the upstream direction to the downstream direction, the system comprising:

a holding tube, a heat exchanger upstream of the holding tube, a second heating/cooking device upstream of the holding tube, a reciprocating pump for controlling the flow of eggs through the holding tube and at least one extruder downstream of the holding tube, the heat exchanger effective for heating the liquid egg product from the holding tank to a temperature effective for preventing heat shock, but not cook the liquid egg product to provide an initially heated liquid egg product, the second heating/cooking device selected from the group consisting of a second heat exchanger and a steam injection device effective for injecting steam into the initially heated liquid egg product and providing a steam heated liquid egg product, the second heating/cooking device effective for heating the initially heated liquid egg product to a cooking temperature;

the holding tube for receiving a flow of liquid egg product which has been heated in the second heating/cooking device, the holding tube being of sufficient length to cook the egg which has been heated to the cooking temperature, the reciprocating pump for controlling the flow of eggs through the holding tube effective for stopping and starting the flow of heated liquid egg product through to the holding tube, the holding tube maintaining the egg product heated in the second heating/cooking device for a time and temperature effective for cooking the egg product, and the extruder downstream from the holding tube for forming scrambled egg product.

5. The system as recited in claim 4, wherein the system provides the scrambled egg product with a homogeneous firmness of from about 20 mm to about 50 mm.

6. The system as recited in claim 4, wherein the second heating device is the steam injection device.

7. The system as recited in claim 4, wherein the second heating device is the second heat exchanger.

8. A system for producing scrambled egg product, the system effective for moving egg from the upstream direction to the downstream direction, the system comprising:

a holding tank, a holding tube, a heat exchanger upstream of the holding tube, a steam injection device upstream of the holding tube, a reciprocating pump for controlling the flow of eggs through the holding tube and at least one extruder downstream of the holding tube, the holding tank effective for holding a liquid egg product at below a temperature of about 50° F., the heat exchanger effective for heating the liquid egg product from the holding tank to a temperature in the range of from about 130° F. to about 154° F. to provide an initially heated liquid egg product, the steam injection device effective for injecting steam into the initially heated liquid egg product and providing a steam heated liquid egg product, the steam injection device effective for heating the initially heated liquid egg product to a cooking temperature and to provide a flow of steam heated liquid egg product;

the holding tube for receiving the flow of steam heated liquid egg product, the holding tube being of sufficient length to cook the egg which has been heated to the cooking temperature, the reciprocating pump effective for stopping and starting the flow of steam heated liquid egg product through the holding tube, the holding tube maintaining the steam heated egg product for a time and temperature effective for cooking the steam heated egg product, and the extruder downstream from the holding tube for forming scrambled egg product.

9. The system as recited in claim 8, wherein the system provides the scrambled egg product with a homogeneous firmness of from about 20 mm to about 50 mm.

10. A system for producing scrambled egg product, the system effective for moving egg from the upstream direction to the downstream direction, the system comprising:

a holding tank, a holding tube, a first heat exchanger upstream of the holding tube, a second heat exchanger upstream of the holding tube and downstream the first heat exchanger, a reciprocating pump which controls the flow of eggs through the holding tube and at least one extruder downstream of the holding tube, the holding tank effective for holding a liquid egg product at below a temperature of about 50° F., the first heat exchanger effective for heating the liquid egg product from the holding tank to a temperature in the range of from about 130° F. to about 154° F. to provide an initially heated liquid egg product, the second heating exchanger effective for heating the initially heated liquid egg product to a cooking temperature;

the holding tube for receiving a flow of liquid egg product which has been heated in the second heat exchanger, the holding tube being of sufficient length to cook the egg which has been heated to the cooking temperature, the reciprocating pump controlling the flow of eggs through the holding tube effective for stopping and starting the flow of heated liquid egg product through the holding tube, the holding tube maintaining the egg product heated in the second heat exchanger for a time and temperature effective for cooking the egg product, and the extruder downstream from the holding tube for forming scrambled egg product.

11. The system as recited in claim 10, wherein the system provides the scrambled egg product with a homogeneous firmness of from about 20 mm to about 50 mm.

12. A system for producing scrambled egg product, the system comprising:

a holding tank effective for holding a liquid egg product at below a temperature of about 50° F.;

a first heat exchanger effective for heating the liquid egg product from the holding tank to a temperature in the range of from about 130° F. to about 154° F. to provide an initially heated liquid egg product;

a second heat exchanger effective for heating the initially heated liquid egg product to a cooking temperature;

at least two holding tubes which receive a flow of heated liquid egg product heated in the second heat exchanger;

and a valve for controlling the flow of eggs to the at least two holding tubes, the valve effective for stopping and starting the flow of steam heated liquid egg product and switching the flow of egg product between the at least two holding tubes, the at least two holding tubes maintaining the steam heated egg product for a time and temperature effective for cooking the steam heated egg product.

13. The system as recited in claim 12 wherein the system further includes an extruder downstream from the holding tubes for forming scrambled egg product.

14. The system as recited in claim 13, wherein the system provides the scrambled egg product with a homogeneous firmness of from about 20 mm to about 50 mm.

* * * * *